(12) United States Patent
Nishiyama

(10) Patent No.: US 8,472,050 B2
(45) Date of Patent: Jun. 25, 2013

(54) FILE TRANSMISSION APPARATUS, METHOD AND FILE VERSION MANAGEMENT SYSTEM

(75) Inventor: Masashi Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 816 days.

(21) Appl. No.: 12/598,587

(22) PCT Filed: Jul. 4, 2008

(86) PCT No.: PCT/JP2008/062537
§ 371 (c)(1), (2), (4) Date: Nov. 2, 2009

(87) PCT Pub. No.: WO2009/011294
PCT Pub. Date: Jan. 22, 2009

(65) Prior Publication Data
US 2010/0134828 A1 Jun. 3, 2010

(30) Foreign Application Priority Data
Jul. 13, 2007 (JP) .................................. 2007-184654

(51) Int. Cl.
*G06F 3/12* (2006.01)
*H04N 1/00* (2006.01)

(52) U.S. Cl.
USPC ......................................... 358/1.15; 358/402

(58) Field of Classification Search
USPC .................. 358/1.1, 1.8, 1.9, 1.13, 1.14, 400, 358/402, 474, 1.15; 709/201, 203, 219, 220, 709/225
See application file for complete search history.

(56) References Cited

U.S. PATENT DOCUMENTS

| | | | | |
|---|---|---|---|---|
| 6,161,146 A | * | 12/2000 | Kley et al. | 709/248 |
| 6,260,040 B1 | * | 7/2001 | Kauffman et al. | 1/1 |
| 6,449,624 B1 | | 9/2002 | Hammack et al. | |
| 6,801,340 B1 | | 10/2004 | Endo | |
| 2002/0120792 A1 | * | 8/2002 | Blair et al. | 709/330 |
| 2005/0235012 A1 | * | 10/2005 | Harry et al. | 707/203 |

FOREIGN PATENT DOCUMENTS

| | | |
|---|---|---|
| JP | 11215339 A | 8/1999 |
| JP | 2004-363957 A | 12/2004 |

OTHER PUBLICATIONS

Hasegawa Kouji et al., InDesign2 de itte miyou! WebDAV de itte miyou! DTP World, Feb. 13, 2003, vol. 8, No. 2.
Kizaki Kentarou, Solid Edge shinban, SharePoint de data kanri, Nikkei Digital Engineering, Dec. 15, 2001, No. 49.

(Continued)

*Primary Examiner* — Gabriel Garcia
(74) *Attorney, Agent, or Firm* — Fitzpatrick, Cella, Harper & Scinto

(57) ABSTRACT

A file transmission apparatus (101) accepts a file transmission instruction for a transmission destination selected by a user from the transmission destination list, and transmits a check-out request for a file specified by information of the selected transmission destination to the server (102) without the intervention of the user, and transmits a check-in request for a file subjected to the check-out request to the server using an image file input from an image input unit without the intervention of the user, and updates the file stored in the database using the image file. The apparatus registers the image file in the server by transmitting a check-in request of the image file input from the image input device as a new file without the intervention of the user when a file is not specified by the information of the transmission destination selected by the user.

7 Claims, 11 Drawing Sheets

OTHER PUBLICATIONS

Document Management solution, Server Select, Jun. 1, 2006, vol. 2, No. 6.

Japanese Office Action dated Sep. 14, 2012 in corresponding Japanese Application No. 2007-184654.

* cited by examiner

FILE TRANSMISSION APPARATUS, METHOD AND FILE VERSION MANAGEMENT SYSTEM

TECHNICAL FIELD

The present invention relates to a file transmission apparatus which manipulates a file version by sending a check-in or check-out request to a file version management server which performs version management of stored files stored in a database.

BACKGROUND ART

In recent years, multi function peripherals (MFP) that integrate a scanner function, printer function, and the like are prevalently used. Such an MFP is connected to a network to control an output apparatus different from the MFP to print an image, and to store an image in a server via the network. Also, the MFP can send an image by FAX via a public line.

However, since the output destinations or output types of data scanned by, for example, a scanner or the like are diverse, as described above, the user needs to set the output destination and the like every time an MFP outputs data, thus considerably deteriorating user-friendliness. To solve such a problem, various techniques have been developed. Japanese Patent Laid-Open No. 11-215339 discloses a document transmission apparatus, which can improve the operability and processing efficiency upon transmitting document data to a plurality of destinations by a plurality of transmission methods.

In general, in a network to which an MFP is connected, a file version management server is introduced to manage the operation records to files, content histories of files, and the like. Such version management server has a repository database that stores files appended with version information, thereby implementing file management. In case of the aforementioned file management, the user can set a predetermined file in a read and write accessible state by making, at a client terminal, an operation for issuing a check-out request of the file stored in the repository database of the version management server. Furthermore, when the user makes an operation for issuing a check-in request to the repository database of the version management server at the client terminal, he or she can register a predetermined file in the repository database. In recent years, a client terminal such as an MFP or the like communicates with the version management server using a WebDAV (Web-based Distributed Authoring and Versioning) protocol. The specification of WebDAV is defined by RFC (Request For Comment) 2518 "HTTP Extensions for Distributed Authoring" issued by IETF.

Conventionally, upon issuing a check-out or check-in request, the user needs to input an instruction at the client terminal. However, since the MFP terminal normally has poor operability of a panel compared to a general-purpose PC and the like, the aforementioned operations become very troublesome. Therefore, an apparatus or method that allows the user to easily make the version management operation with respect to the version management server at the MFP is expected.

DISCLOSURE OF INVENTION

The present invention provides a file transmission apparatus which allows the user to easily manage the versions of files in a file version management server.

According to one aspect of the present invention, there is provided a file transmission apparatus which communicates with a server that manages versions of a file stored in a database, the apparatus comprising: a storage unit configured to store a transmission destination list which registers a plurality of transmission destinations; an acceptance unit configured to accept a file transmission instruction for a transmission destination selected by a user from the transmission destination list; and an update registration unit configured to, when the acceptance unit receives the file transmission instruction, transmit a check-out request for a file specified by information of the selected transmission destination to the server without the intervention of the user, and transmit a check-in request for a file subjected to the check-out request to the server using an image file input from an image input unit without the intervention of the user, thereby updating the file stored in the database using the image file.

According to another aspect of the present invention, there is provided a file version management system comprising a file transmission apparatus defined above and the server.

According to still another aspect of the present invention, there is provided a file transmission method using a file transmission apparatus which communicates with a server that manages versions of a file stored in a database, the method comprising the steps of: accepting a file transmission instruction for a transmission destination selected by a user from a transmission destination list stored in a storage unit; and when the file transmission instruction is accepted in the step of accepting, transmitting a check-out request for a file specified by information of the selected transmission destination to the server without the intervention of the user and transmitting a check-in request for a file subjected to the check-out request to the server using an image file input from an image input unit without the intervention of the user, thereby updating the file stored in the database using the image file.

According to yet another aspect of the present invention, there is provided a computer-readable storage medium which stores a computer program, wherein the computer program causes a computer to execute the steps of: accepting a file transmission instruction for a transmission destination selected by a user from a transmission destination list stored in a storage unit; and when the file transmission instruction is accepted in the step of accepting, transmitting a check-out request for a file specified by information of the selected transmission destination to the server without the intervention of the user and transmitting a check-in request for a file subjected to the check-out request to the server using an image file input from an image input unit without the intervention of the user, thereby updating the file stored in the database using the image file.

According to the present invention, the user can easily manage the versions of files in the file version management server.

Further features of the present invention will become apparent from the following description of exemplary embodiments with reference to the attached drawings.

BEST MODE FOR CARRYING OUT THE INVENTION

Figure 1:
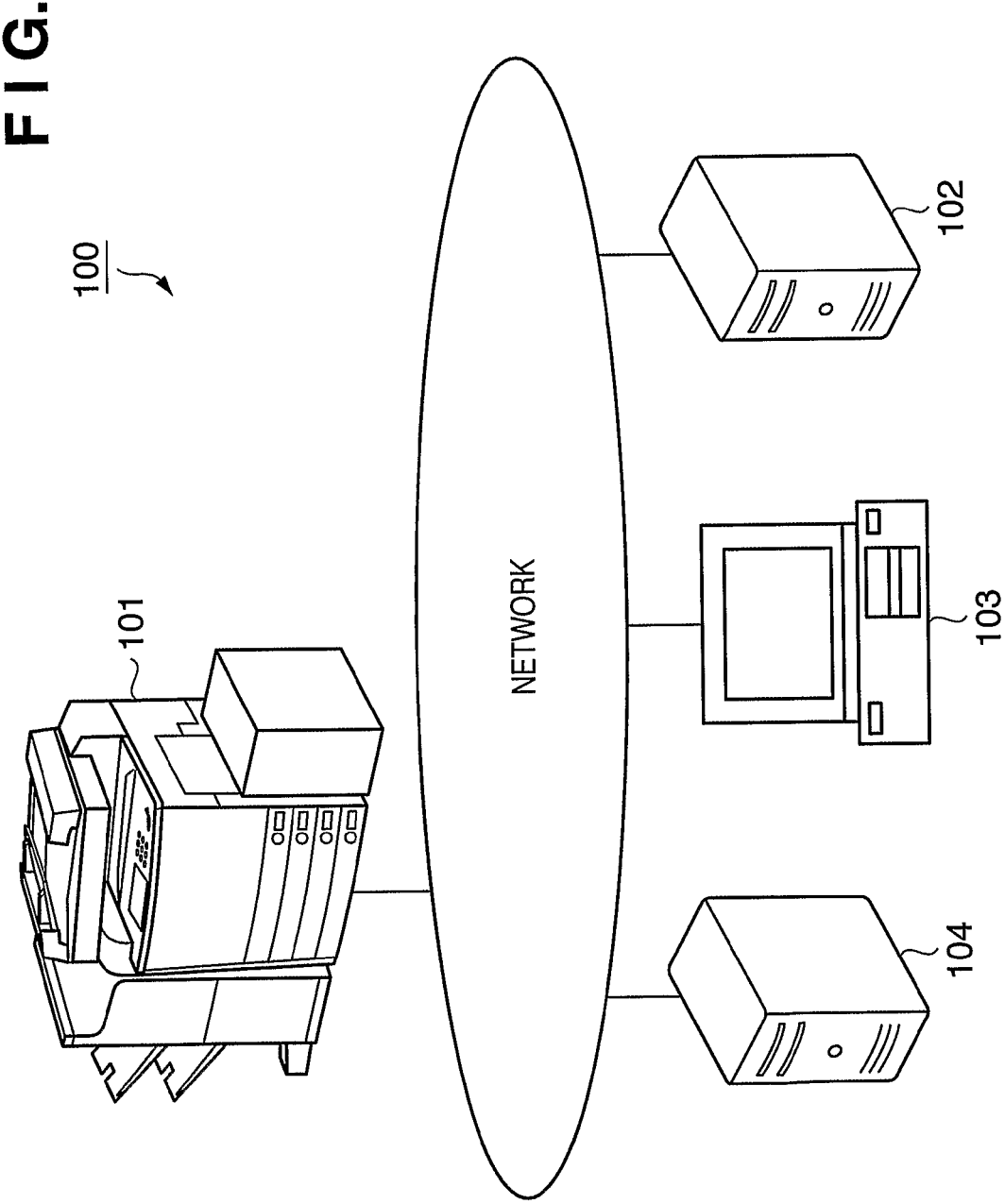
FIG. 1 is a view showing the arrangement of a file version management system including a file transmission apparatus according to an embodiment of the present invention.

The best mode for carrying out the present invention will be described in detail hereinafter with reference to the accompanying drawings. Note that the same reference numerals denote the same components, and a repetitive description thereof will be avoided.

FIG. 1 is a view showing the arrangement of a file version management system including a file transmission apparatus 101 according to an embodiment of the present invention. As shown in FIG. 1, this file version management system 100 includes a file transmission apparatus 101, file version management server 102, and client PC terminal 103. Note that the file transmission apparatus 101 is, for example, an MFP terminal represented by a copying machine, can output a document scanned by a scanner to a printer and can transmit that document by FAX via a public line. The file version management server 102 is a server which has a database that can save operation records with respect to files, content update histories of files, and the like, and is connected to terminals connected to a network. In this embodiment, the file transmission apparatus 101, the client PC terminal 103 as a general-purpose PC, and the like, which are connected to the network, can communicate with the file version management server 102 using the WebDAV protocol.

In FIG. 1, a mail server 104 may be connected to the network. In such arrangement, for example, the file transmission apparatus 101 as a copying machine can output data to the mail server 104 as an e-mail message. Furthermore, the client PC terminal 103 is connected to the mail server 104, can download saved e-mail messages, and can display them on a display.

In general, the file version management server 102 has a repository database to allow the user to manage history information for each file version. In FIG. 1, the terminals connected to the network can issue a check-out or check-in request to the file version management server 102 using the WebDAV protocol.

The check-out and check-in requests in the WebDAV protocol will be described below. When the user issues a check-out or check-in request to the file version management server using the WebDAV protocol, he or she can manipulate the histories of changes of resources such as text files and the like. For example, when the user issues a check-out request to a predetermined file in the repository database of the file version management server 102, that file can be set to be updatable from a client. When the user has changed a file and issues a check-in request, that file is registered in the repository database as a new version.

Figure 2:
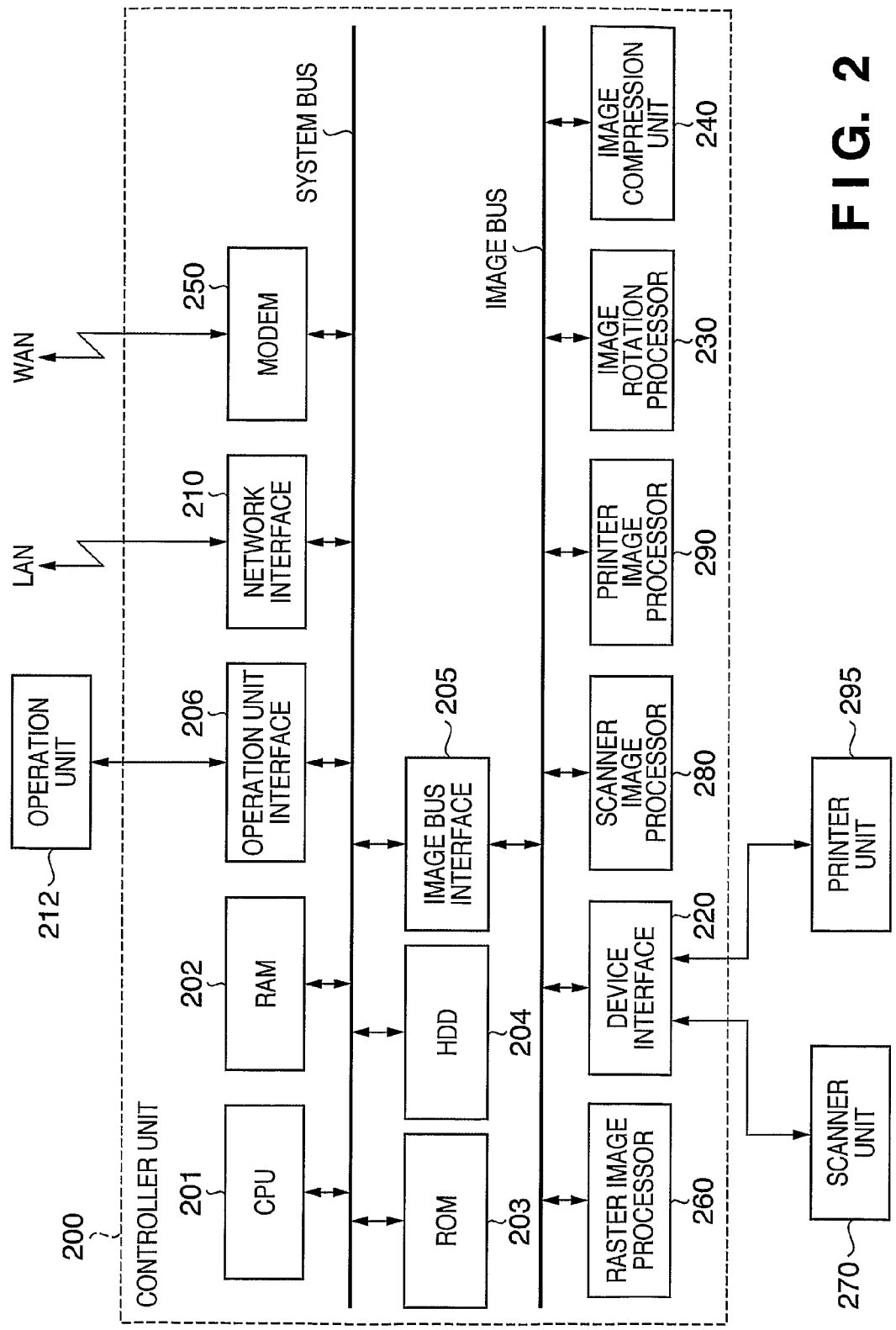
FIG. 2 is a block diagram showing the functional arrangement of the file transmission apparatus shown in FIG. 1.

FIG. 2 is a block diagram showing the functional arrangement of the file transmission apparatus 101 shown in FIG. 1. As shown in FIG. 2, the file transmission apparatus 101 includes a controller unit 200, operation unit 212, scanner unit 270, and printer unit 295. The controller unit 200 is connected to the scanner unit 270 as an image input device, and the printer unit 295 as an image output device, and is also connected to a LAN and WAN such as a public line or the like. Therefore, the controller unit 200 can communicate image information and device information with the scanner unit 270 and printer unit 295, and other terminals via the LAN and WAN. A CPU 201 in the controller unit 200 controls the entire system shown in FIG. 2. A RAM 202 serves as a system work memory required for the operation of the CPU 201, and an image memory used to temporarily store image data. A ROM 203 is a boot ROM which stores a boot program of the system. An HDD 204 is a hard disk drive, which stores system software, image data, destination table, transmission history, and the like. An operation unit interface 206 is an interface with an operation unit 212 having a touch panel, outputs image data to the operation unit 212, and outputs information input by the user from the operation unit 212 to the CPU 201. A network interface 210 is an interface with a LAN, and a modem 250 is an interface with the WAN as a public line. When the controller unit 200 is connected to a WAN other than the public line, an interface according to that WAN may be used in place of the modem 250. The CPU 201, RAM 202, ROM 203, HDD 204, operation unit interface 206, network interface 210, and modem 250 are connected via a system bus, and are controlled by the CPU 201.

An image bus complies with a standard such as a PCI bus, IEEE1394, or the like, and is used to transfer image data at high speed. An image bus interface 205 is arranged as a bus bridge connected to the system bus and image bus, and converts a data structure such as a data width and the like of data to be transferred via the buses. A raster image processor 260 executes rasterization image processing for rasterizing PDL code data into a bitmap image. A device interface 220 is an interface which connects the scanner unit 270, printer unit 295, and image bus, and converts synchronous transfer and asynchronous transfer of image data. A scanner image processor 280 executes correction, modification, edit processing, and the like of input image data input by the scanner unit 270. A printer image processor 290 executes correction, resolution conversion, and the like of printer output image data to be output to the printer unit 295. An image rotation processor 230 executes rotation processing of image data, and an image compression unit 240 executes compression or decompression processing of an image. In this embodiment, for example, multi-valued image data is processed by JPEG, and binary image data is processed by JBIG, MMR, or MH.

Figure 3:
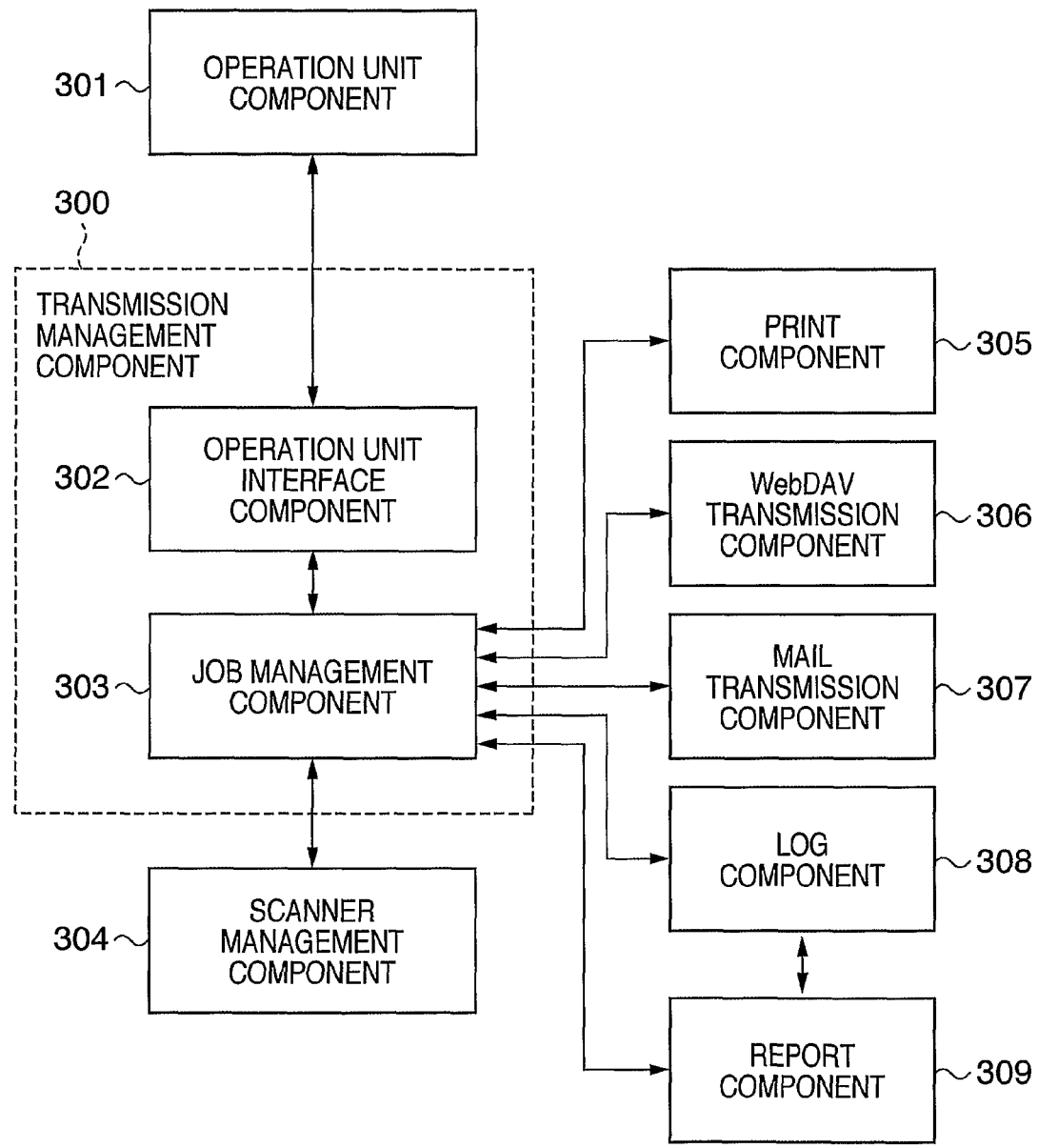
FIG. 3 is a block diagram showing the module configuration of software installed in an MFP shown in FIG. 1.

FIG. 3 is a block diagram showing the module configuration of software installed in the MFP shown in FIG. 1. A transmission management component 300 shown in FIG. 3 includes an operation unit interface component 302, which calls a destination table (transmission destination list), and a job management component 303. The job management component 303 calls required modules according to a job, and executes job control.

The operation of FIG. 3 will be described below taking as an example a case in which a check-in request of a document file scanned by the scanner is issued to the file version management server 102, and a communication result report is output to the printer unit 295.

For example, when the user presses a start key (not shown) provided to the file transmission apparatus 101 on a panel of the operation unit 212, an operation unit component 301 outputs a transmission request to the operation unit interface component 302.

When the operation unit interface component 302 in the transmission management component 300 receives a notification from the operation unit component 301, the job management component 303 outputs a document scan instruction to a scanner management component 304. The job management component 303 outputs a transmission processing command to a WebDAV transmission component 306. The file transmission apparatus 101 and file version management server 102 are ready to communicate with each other, and the WebDAV transmission component 306 issues a check-in request to the file version management server 102. As a result, generated image file can be registered in the file version management server 102. Upon completion of the communication between the file transmission apparatus 101 and file version management server 102, the job management component 303 writes a communication log in a log component 308.

Upon outputting a time-designated communication result report or communication count-designated communication result report, the log component 308 outputs a communication result report output command to a report component 309. Upon outputting a communication result report after the communication processing, the transmission management component 300 outputs a communication result report output command to the report component 309. After the report component 309 generates an image of a communication result report, the job management component 303 outputs a report print command to a print component 305, which executes output processing to the printer unit 295.

Figure 4:
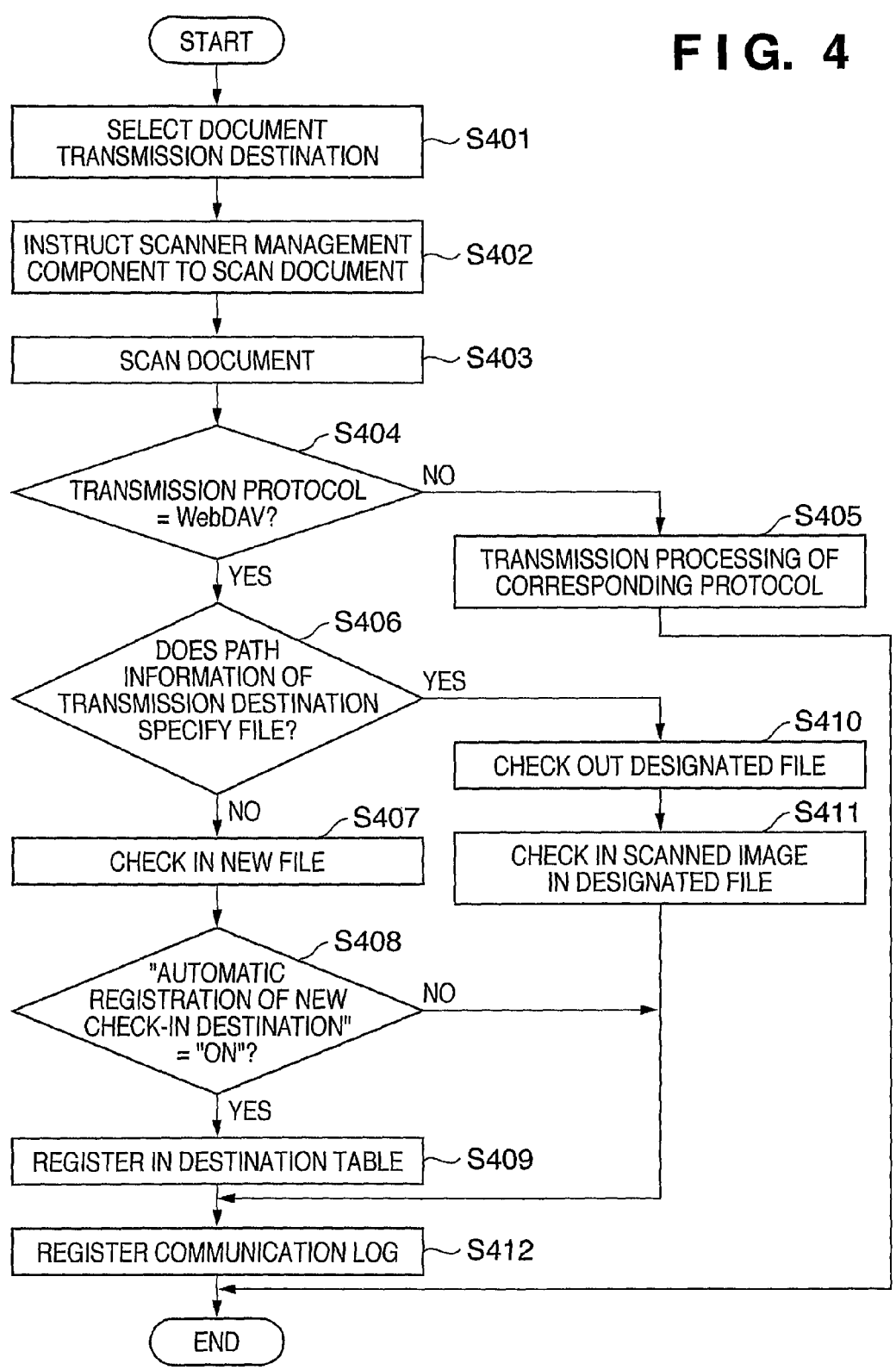
FIG. 4 is a flowchart showing the sequence of processing for transmitting a file to a file version management server in the file transmission apparatus according to the embodiment of the present invention.
Figure 5:
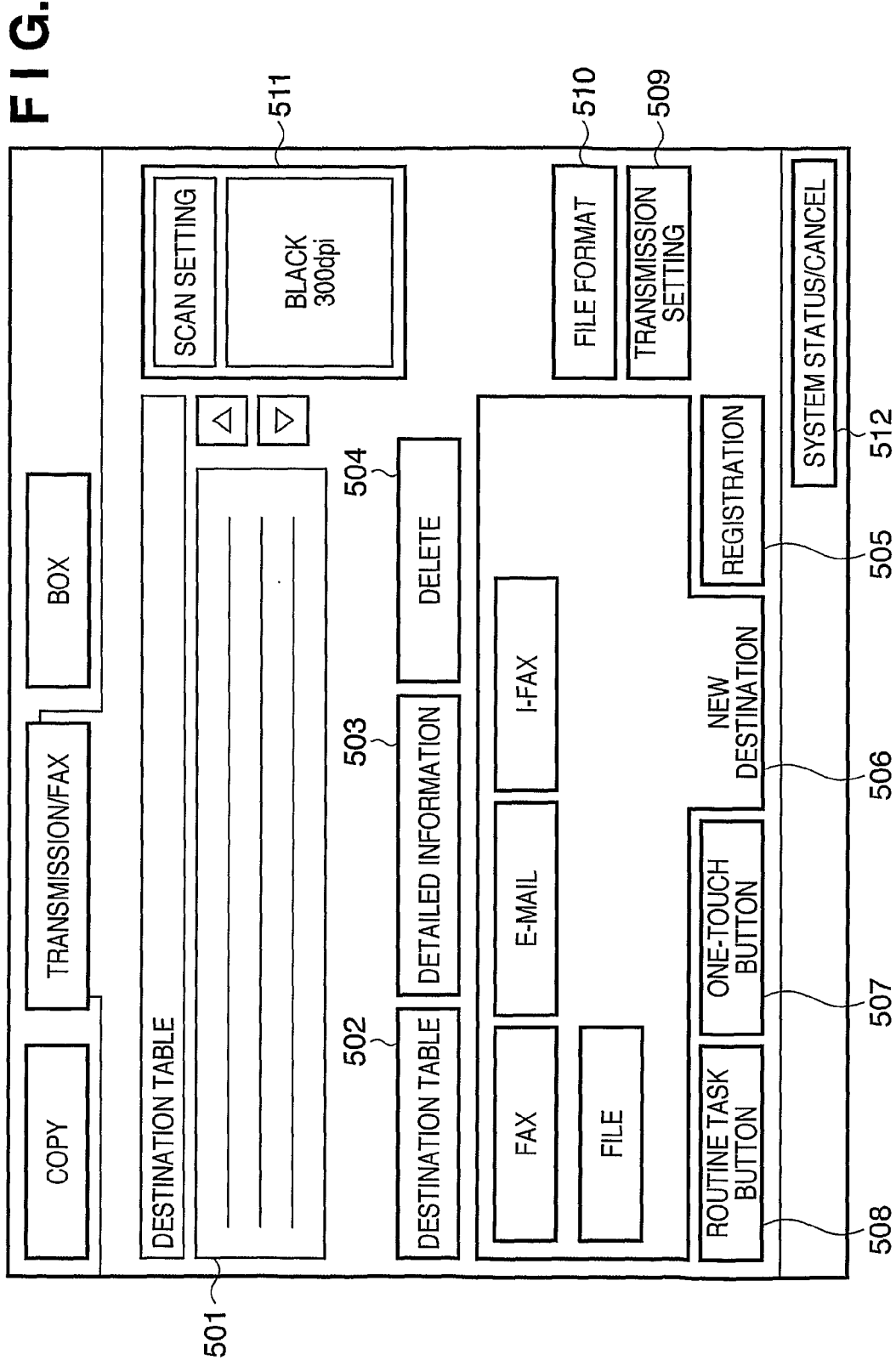
FIG. 5 shows an example of a transmission main window displayed on an operation unit shown in FIG. 2.

FIG. 4 is a flowchart showing the sequence of processing for transmitting a file to the file version management server in the file transmission apparatus according to the embodiment of the present invention. In this embodiment, the user need not make an operation for issuing a check-in or check-out request to the file version management server, thus improving user's convenience. Prior to a description of FIG. 4, a window to be displayed on the operation unit 212 of the file transmission apparatus 101 will be described. FIG. 5 shows an example of a transmission main window displayed on the operation unit 212 shown in FIG. 2. As shown in FIG. 5, the transmission main window on the operation unit 212 includes a destination list display area 501, destination table button 502, detailed information button 503, delete button 504, registration button 505, new destination button 506, one-touch button 507, and routine task button 508. Also, the transmission main window includes a transmission setting button 509, file format button 510, scan setting button 511, and system status/cancel button 512.

In this embodiment, upon pressing the start key (not shown) provided to the file transmission apparatus 101 while the transmission main window is displayed, processing for scanning an image by the scanner unit 270 and transmitting the scanned image to a set destination by a designated method is started. Upon pressing the destination table button 502, a list of transmission destination information such as e-mail, I-FAX, file server, and the like, which are designated in advance by the user, is displayed. In this embodiment, the user can register the transmission destinations such as e-mail, a file server, and the like as a destination table in a storage device such as an HDD. When the user registers transmission destinations in the destination table, the man-hour required to re-input the transmission destinations can be reduced. Also, the user can efficiently select a transmission destination from the destination table using the functions of the one-touch button 507, routine task button 508, and the like. When the user selects a desired destination from the destination list display area 501 and presses the delete button 504, he or she can delete that transmission destination from the destination table. Upon pressing the file format button 510, the user can set a file format of image data to be transmitted to the transmission destination. Image data input by the scanner unit 270 is converted into the file format set upon pressing of the file format button 510, and is transmitted to a transmission destination. Upon pressing the scan setting button 511, the user can open a window used to make document scan settings, and can change and register the scan settings such as a color mode, paper size, resolution, density, document type, and the like upon scanning by the scanner unit 270. Upon pressing the detailed information button 503, the user can confirm the designated transmission destination before transmission. The registration button 505, new destination button 506, transmission setting button 509, system status/cancel button 512 will be described later.

Figure 6:
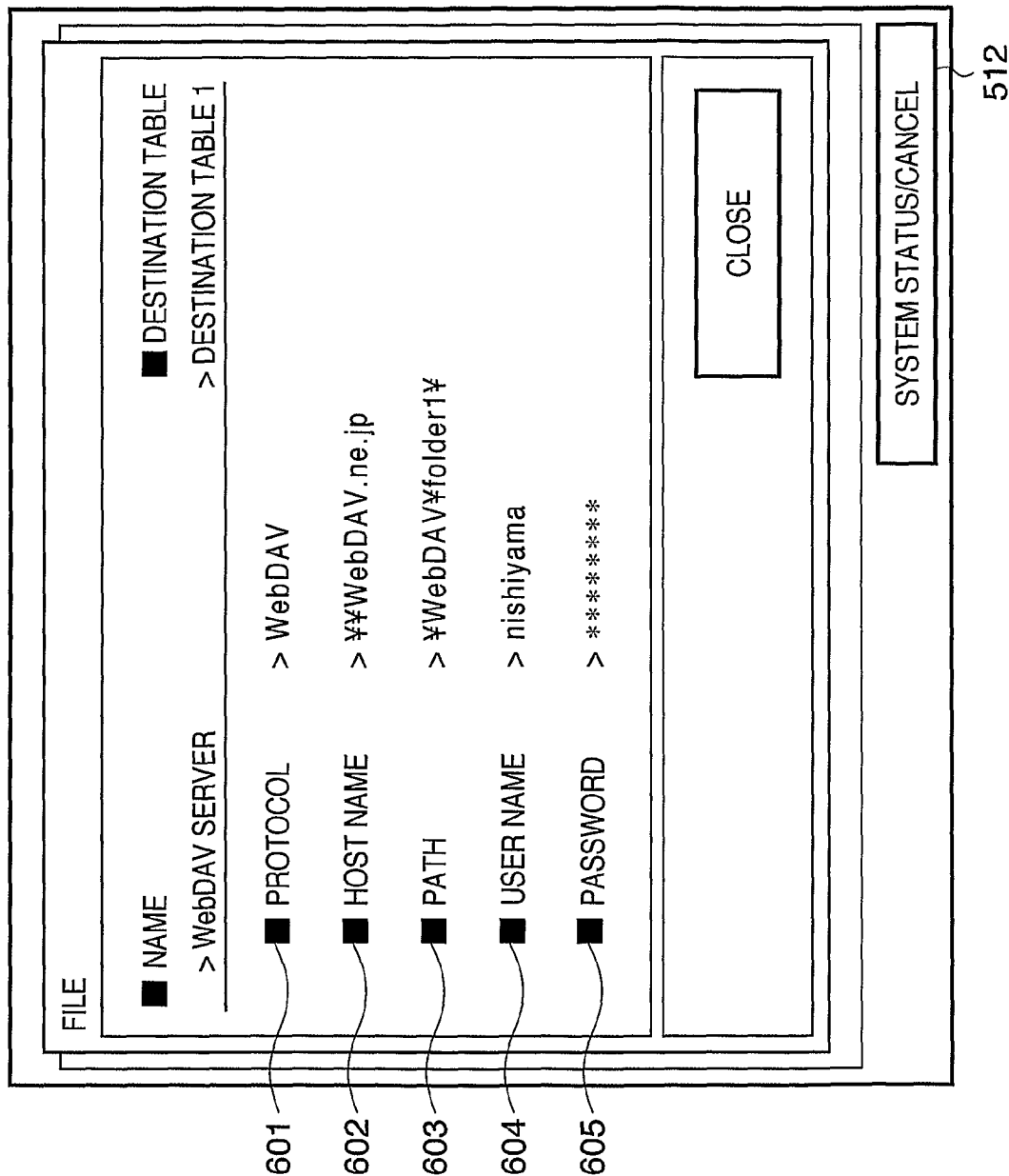
FIG. 6 shows an example of a destination detailed information window displayed when a transmission destination is a file server.

FIG. 6 shows an example of a destination detailed information window displayed when the transmission destination is a file server. The window shown in FIG. 6 is displayed when the user selects a desired transmission destination from the destination table shown in FIG. 5 and then presses the detailed information button 503. As shown in FIG. 6, a display field 601 displays a protocol used upon making a communication with a server as the transmission destination, a display field 602 displays a host name of the transmission destination server, and a display field 603 displays a path. Also, a display field 604 displays a user name used upon authentication with the server, and a display field 605 displays a password used upon authentication with the server.

Upon pressing the new destination button 506 shown in FIG. 5, the user can register, in the destination table, a transmission destination which is not registered in the destination table. When the user presses the new destination button 506, a window indicating the types of transmission destination is displayed. In FIG. 5, "FAX", "e-mail", "I-FAX", and "file" are displayed, and it is assumed that the user selects "file" on this window.

Figure 7:
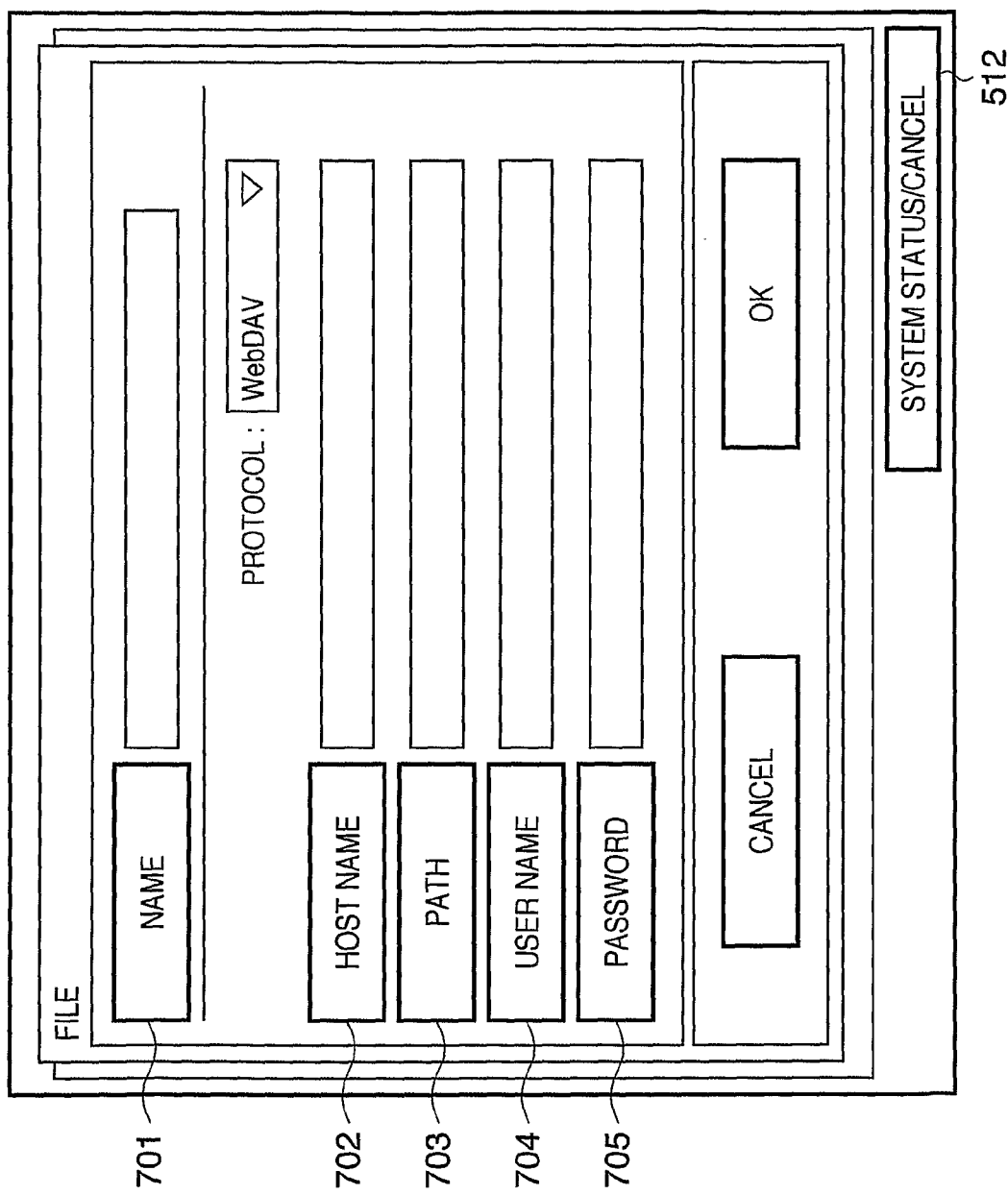
FIG. 7 shows an example of a destination registration window when the destination of a file server is registered as a transmission destination.

FIG. 7 shows an example of a destination registration window when the user registers the destination of the file server as a transmission destination. The window shown in FIG. 7 is displayed when the user presses the new destination button 506 and selects "file". Upon pressing a name registration key 701 shown in FIG. 7, a text input window is displayed on the operation unit 212, and the user can input an abbreviated name of the destination using a keyboard and numeric keypad on the operation unit 212. Upon pressing a host name registration key 702, the text input window is displayed on the operation unit 212, and the user can input a desired address using the keyboard and numeric keypad on the operation unit 212. Upon pressing a path registration key 703, the text input window is displayed on the operation unit 212, and the user can input a desired path using the keyboard and numeric keypad on the operation unit 212. Upon pressing a user name registration key 704, the text input window is displayed on the operation unit 212, and the user can input a desired user name using the keyboard and numeric keypad on the operation unit 212. Upon pressing a password registration key 705, the text input window is displayed on the operation unit 212, and the user can input a desired password using the keyboard and numeric keypad on the operation unit 212. When the user enters desired data to the respective items, and presses an "OK" button and then the registration button 505 shown in FIG. 5, the new destination can be registered in the destination table. Upon pressing the system status/cancel button 512, the user can confirm the statuses and histories of various jobs and can cancel a job.

Figure 8:
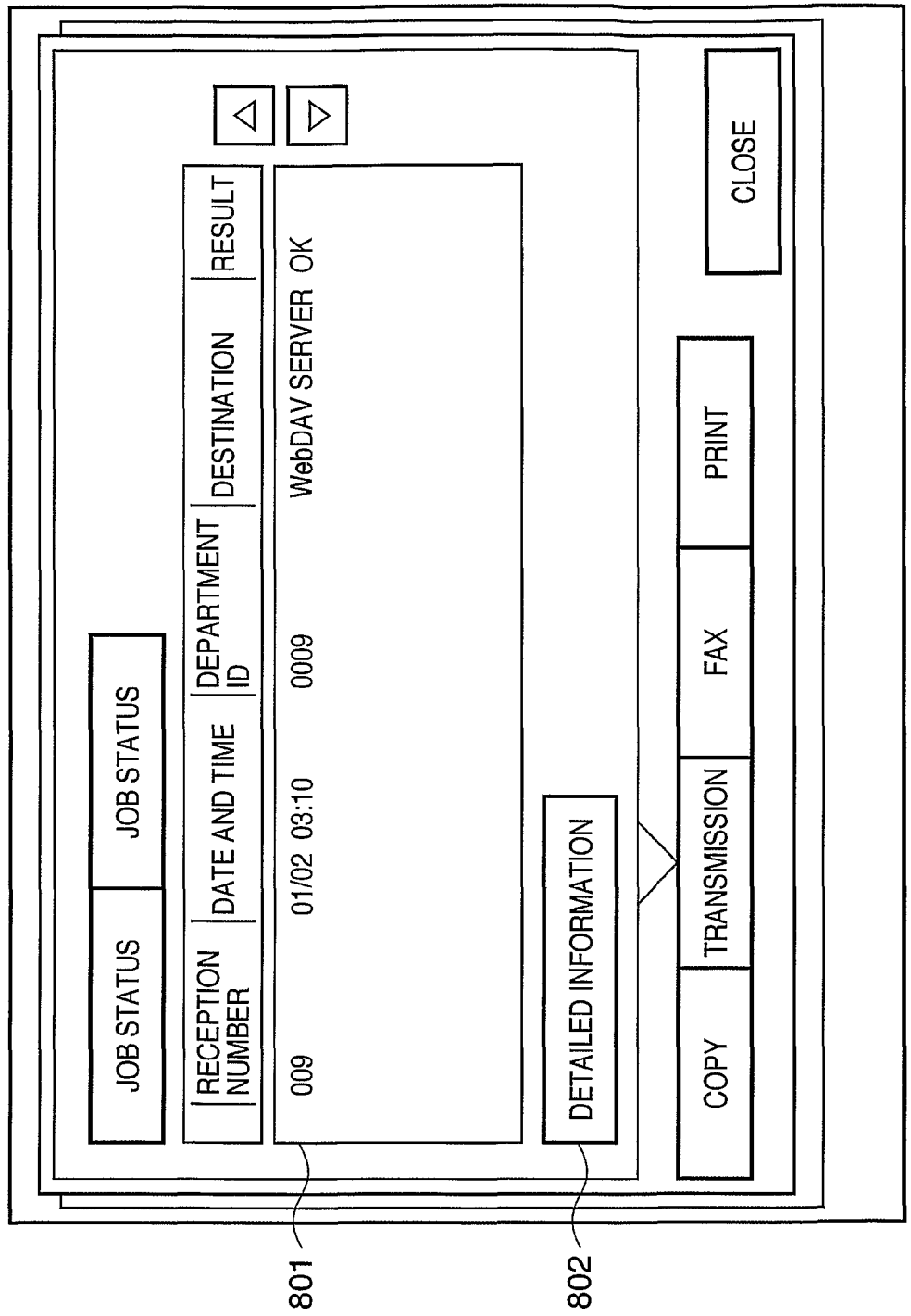
FIG. 8 shows an example of a transmission history window.

FIG. 8 shows an example of a transmission history window. The window shown in FIG. 8 is displayed when the user presses the system status/cancel button 512. As shown in FIG. 8, the transmission history window includes a history list display area 801 (which displays a history list) and detailed information button 802. The history list display area 801 displays a list of registered destinations. When the user selects a desired history, and presses the detailed information button 802, a detailed history information window can be displayed.

Figure 9:
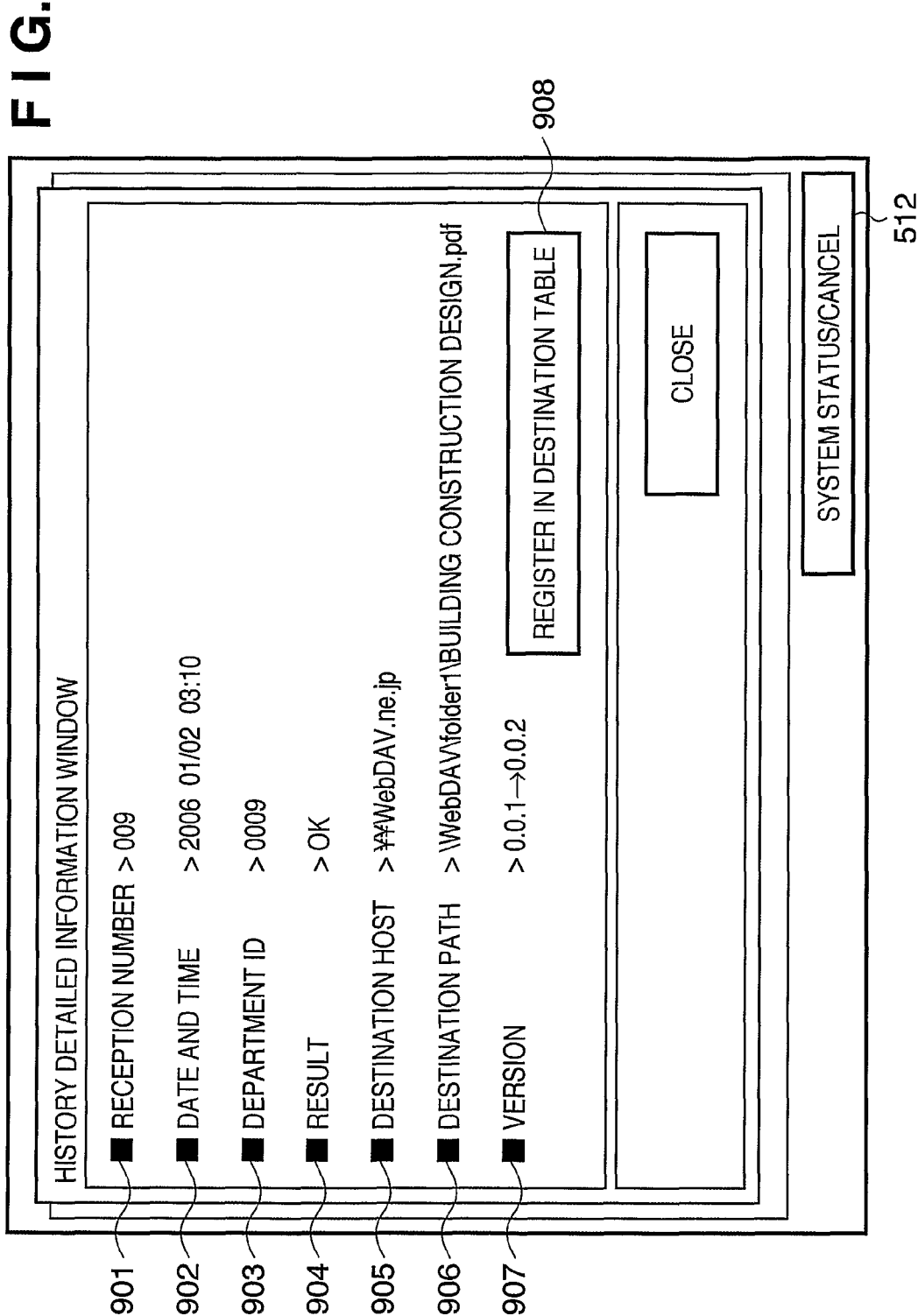
FIG. 9 shows an example of a history detailed information window.

FIG. 9 shows an example of the detailed history information window. A display field 901 shown in FIG. 9 displays a sequential reception number which is incremented for each transmission job. A display field 902 displays the date and time upon execution of this transmission processing. A display field 903 displays a department ID assigned when the file transmission apparatus 101 of this embodiment undergoes department management. A display field 904 displays a result of this transmission processing. A display field 905 displays a host name of the transmission destination of this transmission processing. A display field 906 displays path information of the transmission destination of this transmission processing. A display field 907 displays an update history in the file version management system. FIG. 9 displays that the version of "building construction design.pdf" displayed in the display field 906 is "0.0.1" before this transmission processing, and is changed to "0.0.2" after this transmission processing. Upon pressing a registration button 908, the user can register the information in the display fields 905 and 906 in the destination table as a new transmission destination.

Figure 10:
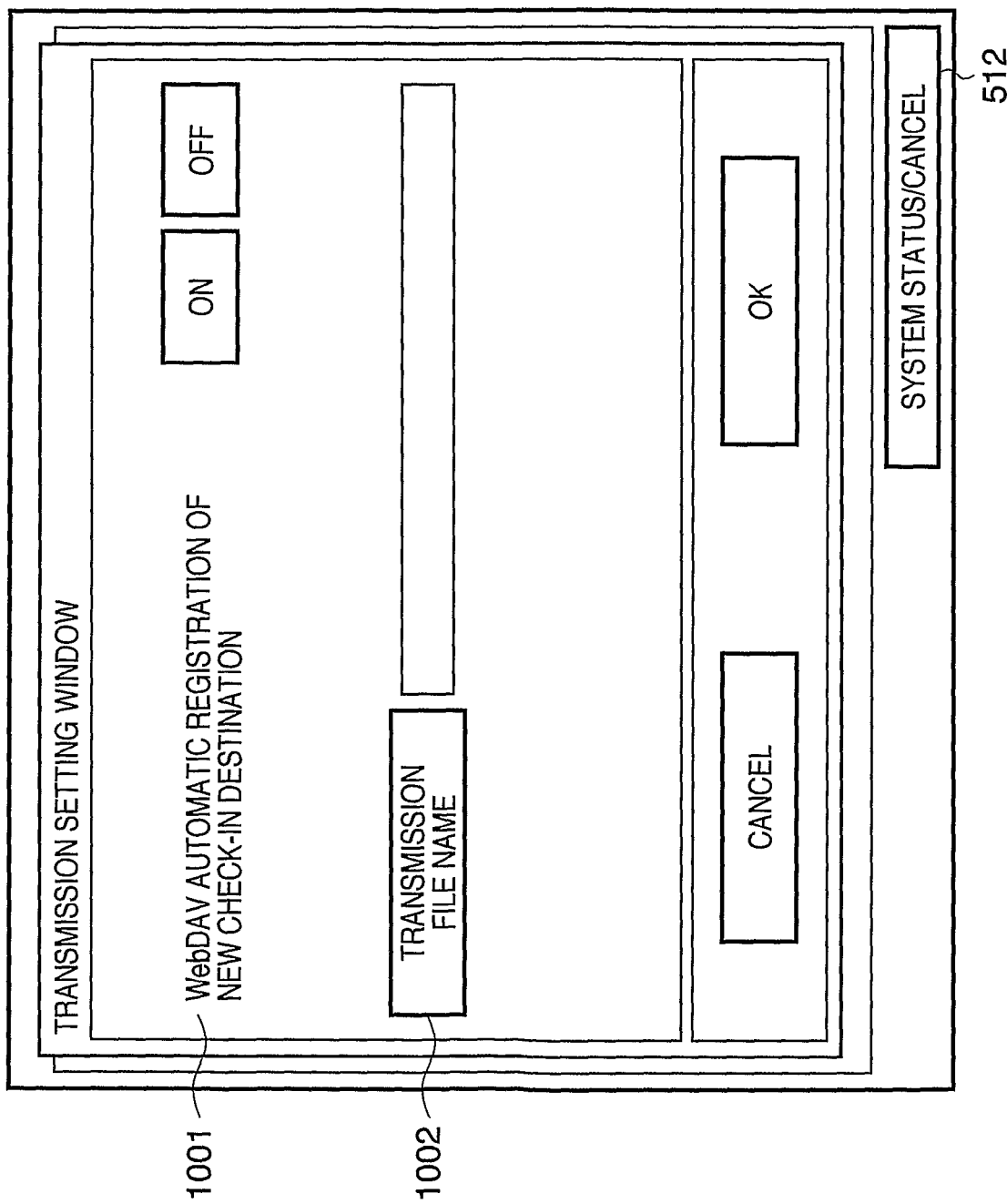
FIG. 10 shows an example of a transmission setting window.

FIG. 10 shows an example of a transmission setting window. When the user presses the transmission setting button 509 shown in FIG. 5, the transmission setting window shown in FIG. 10 is displayed. When the user sets "automatic registration of WebDAV new check-in destination" displayed on a setting area 1001 to be "ON", a new transmission destination whose check-in request was issued to the file version management server can be automatically registered in the destination table. Upon pressing a transmission file name registration key 1002, the text input window is displayed, and the user can input a file name using the keyboard and numeric keypad on the operation unit 212. The input file name is used as a file name when no file name is specified in path information of the transmission destination.

Referring back to FIG. 4, the sequence of file transmission processing in the file transmission apparatus 101 will be explained. In step S401, the user selects a desired document transmission destination from the destination list display area 501 on the transmission main window shown in FIG. 5. In this embodiment, assume that destination information shown in FIG. 6 has already been registered in the destination table, and the user selects a desired transmission destination. Also, assume that "automatic registration of WebDAV new check-in destination" on the transmission setting window shown in FIG. 10 is set to be "ON".

In step S402, the user presses the start key (not shown) provided on the operation unit 212. Then, the transmission management component 300 of the file transmission apparatus 101 accepts a file transmission instruction by the operation unit component 301, and instructs the scanner management component 304 to scan a document. In step S403, the scanner management component 304 starts scanning of the document set on a document table of the scanner unit 270. It is checked in step S404 if the protocol to the selected transmission destination is "WebDAV". If the protocol is the WebDAV protocol, the transmission management component 300 instructs the WebDAV transmission component 306 to transmit the scanned image to the transmission destination apparatus.

On the other hand, if the protocol of the selected transmission destination is that of e-mail, the transmission management component 300 instructs a mail transmission component 307 to transmit to the transmission destination. Upon instructing the WebDAV transmission component 306 or mail transmission component 307 to transmit, the transmission management component 300 notifies that component of scanned image data and transmission destination information together. The scanned image data is converted into a file format set upon pressing the file format button 510 shown in FIG. 5. It is checked in step S406 if path information of the transmission destination in the WebDAV protocol specifies a file.

If the path information of the transmission destination specifies a file, the process advances to step S410; otherwise, the process advances to step S407. In this embodiment, since the path information on the display field 603 shown in FIG. 6 specifies a folder but it does not specify any file, the process advances to step S407. In step S407, the WebDAV transmission component 306 of the file transmission apparatus 101 requests the file version management server 102 to check in a new file in the folder specified in the transmission destination information. In this case, since the WebDAV transmission component 306 requests the file version management server 102 to check in the scanned image data as a new file, no check-out request is required. In this manner, in this embodiment, the file transmission apparatus 101 can issue a check-in request to the file version management server 102 without the intervention of the user.

It is checked in step S408 if "automatic registration of WebDAV new check-in destination" on the area 1001 of the transmission setting window shown in FIG. 10 is set "ON". In this embodiment, since this function is set "ON", as shown in FIG. 10, the process advances to step S409. If this function is set "OFF", the process jumps to step S412. In step S409, the transmission destination information that specifies the new file in the file version management server 102 is automatically registered in the destination table. If the user sets a file name "building construction design.pdf" upon pressing the transmission file name registration key 1002 shown in FIG. 10, it is also registered as the transmission destination information.

Figure 11:
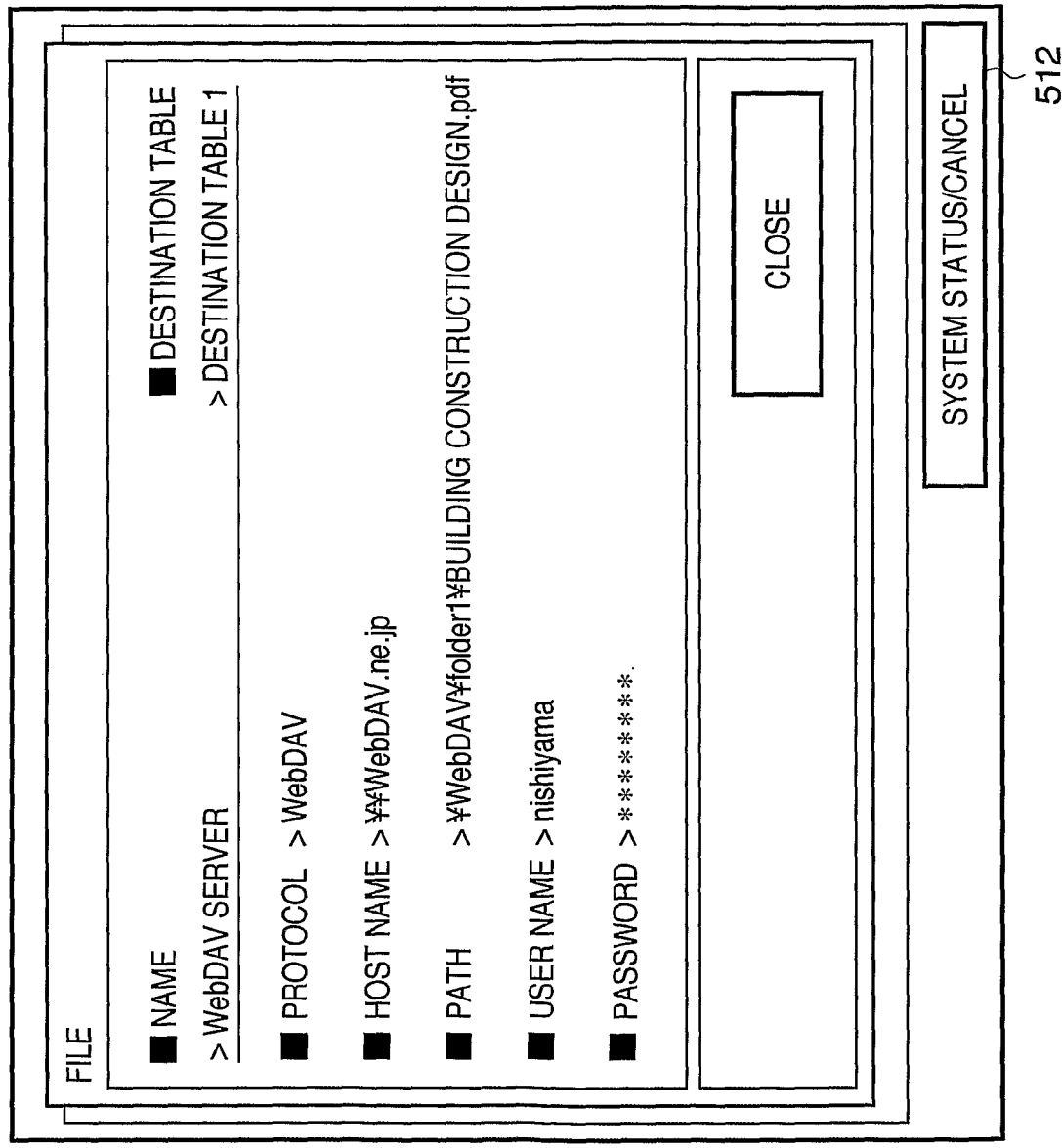
FIG. 11 shows an example of a destination detailed information window when a file is specified by path information of the transmission destination in step S406 in FIG. 4.

Step S406 will be referred to again. If, for example, the path information of the transmission destination specifies a file name (stored file name), as shown in FIG. 11, the process advances to step S410. In step S410, the WebDAV transmission component 306 of the file transmission apparatus 101 automatically transmits a check-out request for a file specified by the transmission destination path information. The file version management server 102 checks out the specified file based on the check-out request. Since such a check-out request is issued, the file stored in the repository database is set in a read or write accessible state. For example, a "building construction design.pdf" file specified by the path name shown in FIG. 11 is set in a read or write accessible state from the client. In step S411, the WebDAV transmission component 306 of the file transmission apparatus 101 automatically transmits a check-in request for the file specified by the transmission, destination path information in the file version management server 102, and registers the scanned image data in that file. That is, the scanned image data is registered as a new version. As described above, according to this embodiment, the file transmission apparatus 101 issues a file check-out request and a check-in request using scanned image data to the file version management server 102 to update the file without the intervention of the user.

When the user has changed the "building construction design.pdf" file stored in the repository database, that change is reflected in the repository database of the file version management server 102, and the version of that file can be managed. Therefore, for example, the client PC terminal 103 searches the history of changes of the "building construction design.pdf" file, and can read out the files of older versions or the latest updated file. In step S412, the WebDAV transmission component 306 of the file transmission apparatus 101 registers a log in the log component 308 after completion of the communication. In this embodiment, for example, history detailed information shown in FIG. 9 is registered as a log, and the user can recognize with reference to this history detailed information that the version information is updated from "0.0.1" to "0.0.2". In this embodiment, upon pressing the registration button 908 on the history detailed information window shown in FIG. 9, the user can register the transmission destination information registered in the log in the destination table as a new destination. Therefore, the user can also register the transmission destination information in the destination table as a new destination by browsing the history detailed information after completion of the file transmission processing shown in this flowchart. In this embodiment, the transmission management component 300 serves as an acceptance unit, an update registration unit, a transmission destination registration unit, a setting unit and a history registration unit.

As described above, according to this embodiment, the user need not make any check-in or check-out request operation to the repository database of the file version management server 102. That is, since the check-in or check-out request is issued without the intervention of the user, the user's convenience can be improved.

The present invention also includes a case in which an operating system (OS) or the like running on a computer executes some or all of actual processes based on instructions of a program (file transmission program) code, and the functions of the aforementioned embodiment are implemented by these processes. Furthermore, the present invention is also applied to a case in which the program code read out from a storage medium is written in a memory equipped on a function expansion card or unit, which is inserted into or connected to a computer. In this case, a CPU or the like equipped on the function expansion card or unit executes some or all of actual processes based on instructions of the written program code, and the functions of the aforementioned embodiment are implemented by these processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-184654, filed Jul. 13, 2007, which is hereby incorporated by reference herein in its entirety.

The invention claimed is:

1. A file transmission apparatus which communicates with a server that manages versions of a file stored in a database, the apparatus comprising:

a storage unit configured to store a transmission destination list which registers a plurality of transmission destinations;

a selection unit configured to allow a user to select a transmission destination of the plurality of transmission destinations registered in the transmission destination list;

an acceptance unit configured to accept a file transmission instruction for the transmission destination selected by said selection unit;

a determination unit configured to determine whether path information of the transmission destination instructed by the file transmission instruction specifies a folder or a file;

a newly registration unit configured to, in a case where the determination unit determines that the path information of the transmission destination instructed by the file transmission instruction specifies the folder, newly register, as a new file, an image file input by an image input device into the specified folder by transmitting a check-in request to the server without an intervention of the user, wherein the check-in request is a request for registering a file into the specified folder as the new file;

a transmission destination registration unit configured to register path information of the new file registered by the newly registration unit as a new transmission destination in the transmission destination list, in a case where an automatically registration of the path information of the new file targeted to the check-in request to the transmission destination list is set in advance; and an update registration unit configured to, in a case where the determination unit determines that the path information of the transmission destination instructed by the file transmission instruction specifies the file, transmit a check-out request for a file specified by the path information of the selected transmission destination to the server without the intervention of the user, and transmit a check-in request for the file subjected to the check-out request to the server using an image file input from the image input device without the intervention of the user, thereby updating the file stored in the database using the image file.

2. The apparatus according to claim 1, wherein the file transmission apparatus communicates with the server using a WebDAV protocol.

3. The apparatus according to claim 1, wherein the file transmission apparatus comprises a multi-function device including the image input device unit.

4. A file version management system comprising the file transmission apparatus defined in claim 1 and the server.

5. A file transmission apparatus which communicates with a server that manages versions of a file stored in a database, the apparatus comprising:

a storage unit configured to store a transmission destination list which registers a plurality of transmission destinations;

an acceptance unit configured to accept a file transmission instruction for a transmission destination selected by a user from the transmission destination list; and an update registration unit configured to, when said acceptance unit receives the file transmission instruction, transmit a check-out request for a file specified by information of the selected transmission destination to the server without the intervention of the user, and transmit a check-in request for a file subjected to the check-out request to the server using an image file input from an image input unit without the intervention of the user, thereby updating the file stored in the database using the image file, wherein the apparatus further comprises a history registration unit configured to register, as history information, update and registration of the image file by said update registration unit, and said transmission destination registration unit registers, in the transmission destination list, the transmission destination selected by the user from the history information registered by said history registration unit.

6. A file transmission method using a file transmission apparatus which communicates with a server that manages versions of a file stored in a database, the method comprising the steps of:

storing, in a storage unit, a transmission destination list which registers a plurality of transmission destinations;

a selecting step of allowing a user to select a transmission destination of the plurality of transmission destinations registered in the transmission destination list;

accepting a file transmission instruction for the transmission destination selected in the selecting step;

a determination step of determining whether path information of the transmission destination instructed by the file transmission instruction specifies a folder or a file;

a newly registration step of, in a case where the determination step determines that the path information of the transmission destination instructed by the file transmission instruction specifies the folder, newly register, as a new file, an image file input by an image input device into the specified folder by transmitting a check-in request to the server without an intervention of the user, wherein the check-in request is a request for registering a file into the specified folder as the new file;

a transmission destination registration step of registering path information of the new file registered by the newly registration step as a new transmission destination in the transmission destination list, in a case where an automatically registration of the path information of the new file targeted to the check-in request to the transmission destination list is set in advance; and an update registration step of, in a case where the determination step determines that the path information of the transmission destination instructed by the file transmission instruction specifies the file, transmitting a check-out request for a file specified by the path information of the selected transmission destination to the server without the intervention of the user and transmitting a check-in request for the file subjected to the check-out request to the server using an image file input from the image input device without the intervention of the user, thereby updating the file stored in the database using the image file.

7. A non-transitory computer-readable storage medium which stores computer executable code of a computer program, wherein the computer program, when executed by a processor of a computer, causes the computer to execute the steps of:

storing, in a storage unit, a transmission destination list which registers a plurality of transmission destinations;

a selecting step of allowing a user to select a transmission destination of the plurality of transmission destinations registered in the transmission destination list;

accepting a file transmission instruction for the transmission destination selected in the selecting step;

a determination step of determining whether path information of the transmission destination instructed by the file transmission instruction specifies a folder or a file;

a newly registration step of, in a case where the determination step determines that the path information of the transmission destination instructed by the file transmission instruction specifies the folder, newly register, as a new file, an image file input by an image input device into the specified folder by transmitting a check-in request to the server without an intervention of the user, wherein the check-in request is a request for registering a file into the specified folder as the new file;

a transmission destination registration step of registering path information of the new file registered by the newly registration step as a new transmission destination in the transmission destination list, in a case where an automatically registration of the path information of the new file targeted to the check-in request to the transmission destination list is set in advance; and an update registration step of, in a case where the determination step determines that the path information of the transmission destination instructed by the file transmission instruction specifies the file, transmitting a check-out request for a file specified by the path information of the selected transmission destination to the server without the intervention of the user and transmitting a check-in request for the file subjected to the check-out request to the server using an image file input from the image input device without the intervention of the user, thereby updating the file stored in the database using the image file.

* * * * *